United States Patent
Odenwalder et al.

(10) Patent No.: US 7,230,941 B2
(45) Date of Patent: Jun. 12, 2007

(54) PREAMBLE CHANNEL DECODING

(75) Inventors: Joseph P. Odenwalder, Rancho Sante Fe, CA (US); Sandip Sarkar, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 09/843,553

(22) Filed: Apr. 26, 2001

(65) Prior Publication Data

US 2002/0159412 A1   Oct. 31, 2002

(51) Int. Cl.
*H04B 7/216* (2006.01)

(52) U.S. Cl. .................................. 370/342; 370/441

(58) Field of Classification Search ................ 370/335, 370/342, 441, 468, 509
See application file for complete search history.

(56) References Cited

U.S. PATENT DOCUMENTS

| | | | |
|---|---|---|---|
| 4,757,536 A * | 7/1988 | Szczutkowski et al. ..... | 380/274 |
| 4,901,307 A | 2/1990 | Gilhousen et al. | |
| 5,103,459 A | 4/1992 | Gilhousen et al. | |
| 5,414,796 A | 5/1995 | Jacobs et al. | |
| 6,018,555 A * | 1/2000 | Mahany ...................... | 375/347 |
| 6,046,990 A * | 4/2000 | Chennakeshu et al. ..... | 370/317 |
| 6,169,731 B1 * | 1/2001 | Stewart et al. .............. | 370/332 |
| 6,278,703 B1 * | 8/2001 | Neufeld ....................... | 370/342 |
| 6,285,681 B1 * | 9/2001 | Kolze et al. ................. | 370/442 |
| 2002/0105929 A1* | 8/2002 | Chen et al. .................. | 370/335 |

FOREIGN PATENT DOCUMENTS

WO       9914885       3/1999

OTHER PUBLICATIONS

Ghosh et al., "Performance of Coded High Order Modulation and Hybrid ARQ for Next Generation Cellular CDMA Systems", *IEEE Vehicular Technology Conference*, vol. 2, pp. 500-505, 2000.

* cited by examiner

*Primary Examiner*—Huy D. Vu
*Assistant Examiner*—Daniel Ryman
(74) *Attorney, Agent, or Firm*—Thomas R. Rouse; Charles Brown; Kam T. Tam (57) ABSTRACT

Rather than attaching a preamble to a data traffic subpacket, a preamble channel is transmitted along with a traffic channel. In a system wherein the data traffic subpackets are variably sized, preambles can also be variably sized if a target station can decode variably sized preambles. A method and apparatus for decoding variably sized preamble subpackets are presented herein.

13 Claims, 6 Drawing Sheets

PREAMBLE CHANNEL DECODING

BACKGROUND

I. Field of the Invention

The present invention relates generally to communications, and more specifically, to decoding preambles transmitted on preamble channels.

II. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" encompasses both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and proposed high-data-rate systems for data, etc. are promulgated by the Telecommunication Industry Association (TIA), the International Telecommunications Union (ITU), and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. An exemplary described system utilizing CDMA techniques is the cdma2000 ITU-R Radio Transmission Technology (RTT) Candidate Submission (referred to herein as cdma2000), issued by the TIA. The standard for cdma2000 is given in draft versions of IS-2000 and has been approved by the TIA. The cdma2000 proposal is backwards compatible with IS-95 systems. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

In the CDMA systems introduced above, voice and data traffic can be carried in message frames of various lengths. Typically, a remote station in the range of a base station must receive and decode a plurality of message frames in order to determine the complete voice and data payload information. Preambles are attached to the message frames to convey information as to the number of message frames that will carry a given payload. In addition to the number of frames that are needed to carry the full payload, preambles can also carry information identifying the target destinations and the transmission rates of the message frames. Other information, such as the radio link protocol (RLP) sequence numbers of the message frames, can also be included. Hence, the accurate decoding of message frames is dependent upon the detection and decoding of the preambles attached to said message frames. It is desirable to increase the ability of a target station to accurately detect and decode preambles, which would lead to more accurate detection and decoding of payload information.

SUMMARY

Rather than attaching a preamble to a data traffic subpacket, a preamble channel is transmitted along with a traffic channel. In a system wherein the data traffic subpackets are variably sized, preambles can also be variably sized if a target station can decode variably sized preambles. Methods and apparatus for decoding variably sized preamble subpackets are presented herein.

In one aspect, an apparatus in a remote station for decoding a preamble channel is presented, wherein the preamble channel carries variably sized preamble sequences. The apparatus includes a plurality of preamble size detection elements for determining a number of slots occupied by a preamble sequence on the preamble channel, wherein each of the plurality of preamble size detection elements outputs a potential preamble sequence and a best path metric; and a selection element for choosing a true preamble sequence from the potential preamble sequences output from the plurality of detection elements.

In one aspect, a method for determining the preamble information carried by a preamble channel is presented. The method includes de-interleaving over a variable number of slots to generate a plurality of de-interleaving results; soft-combining symbols within each of the plurality of de-interleaving results, except in the instance when the de-interleaving is over one slot; decoding the one-slot de-interleaved symbol and the soft-combined symbols associated with each of the plurality of de-interleaving results; checking the decoded symbols for an identifier; and extracting the preamble information from the checked symbol that carries the identifier.

DETAILED DESCRIPTION

Figure 1:
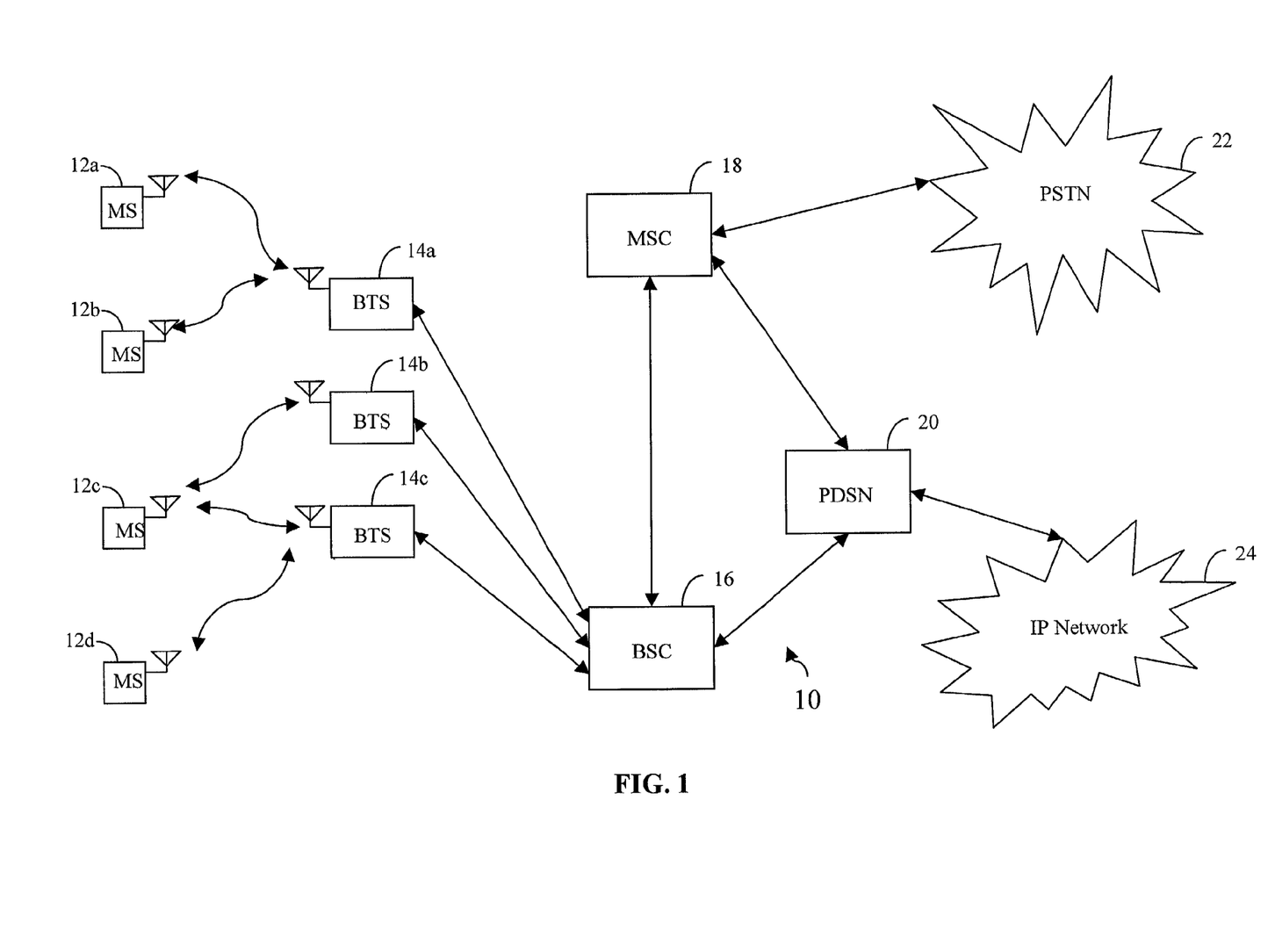
FIG. 1 is a diagram of an exemplary communication system.

As illustrated in FIG. 1, a wireless communication network 10 generally includes a plurality of remote stations (also called mobile stations or subscriber units or user equipment) 12a–12d, a plurality of base stations (also called base station transceivers (BTSs) or Node B) 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a–12d, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment the wireless communication network 10 is a packet data services network. The remote stations 12a–12d, may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, remote stations may be any type of communication unit.

The remote stations 12a–12d, may be configured to perform one or more wireless packet data protocols such as described in, for example, the EIA/TIA/IS-707 standard. In a particular embodiment, the remote stations 12a–12d generate IP packets destined for the IP network 24 and encapsulate the IP packets into frames using a point-to-point protocol (PPP).

In one embodiment, the IP network 24 is coupled to the PDSN 20, the PDSN 20 is coupled to the MSC 18, the MSC 18 is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, Frame Relay, HDSL, ADSL, or XDSL. In an alternate embodiment, the BSC 16 is coupled directly to the PDSN 20, and the MSC 18 is not coupled to the PDSN 20. In another embodiment, the remote stations 12a–12d communicate with the base stations 14a–14c over an RF interface defined in the $3^{rd}$ Generation Partnership Project 2 "3GPP2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a–14c receive and demodulate sets of reverse-link signals from various remote stations 12a–12d, engaged in telephone calls, Web browsing, or other data communications. Each reverse-link signal received by a given base station 14a–14c is processed within that base station 14a–14c. Each base station 14a–14c may communicate with a plurality of remote stations 12a–12d by modulating and transmitting sets of forward-link signals to the remote stations 12a–12d. For example, as shown in FIG. 1, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d, from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission, such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

The process of transmitting both data and voice on the forward and reverse links can be problematic. In a system using variable rate encoding and decoding of voice traffic, a base station will not transmit voice traffic at a constant power level. The use of variable rate encoding and decoding converts speech characteristics into voice frames that are optimally encoded at variable rates. In an exemplary CDMA system, these rates are full rate, half rate, quarter rate, and eighth rate. These encoded voice frames can then be transmitted at different power levels, which will achieve a desired target frame error rate (FER) if the system is designed correctly. The use of variable rate encoding and decoding is described in detail in U.S. Pat. No. 5,414,796, entitled "VARIABLE RATE VOCODER," assigned to the assignee of the present invention and incorporated by reference herein. Since the transmission of voice traffic frames does not necessarily utilize the maximum power levels at which the base station may transmit, packetized data traffic can be transmitted using the residual power.

Hence, if a voice frame is transmitted at a given instant x(t) at X dB but the base station has a maximum transmission capacity of Y dB, then there is (Y−X) dB residual power that can be used to transmit packetized data traffic. Since the voice traffic frames are transmitted at different transmission power levels, the quantity (Y−X) db is unpredictable. One method for dealing with this uncertainty is to repackage data traffic payloads into repetitious and redundant subpackets. Redundant copies of the data payload are packed into frames, or packets, subpackets, or other system-dependent terminology, which are then soft-combined at the receiver. The process of soft-combining allows the recovery of corrupted bits.

Through the process of soft combining, wherein one corrupted subpacket is combined with another corrupted subpacket, the transmission of repetitious and redundant subpackets can allow a system to transmit data at a minimum transmission rate. The transmission of repetitious and redundant subpackets is especially desirable in the presence of fading. Rayleigh fading, also known as multipath interference, occurs when multiple copies of the same signal arrive at the receiver in destructive manner. Substantial multipath interference can occur to produce flat fading of the entire frequency bandwidth. If the remote station is traveling in a rapidly changing environment, deep fades could occur at times when subpackets are scheduled for retransmission. When such a circumstance occurs, the base station requires additional transmission power to transmit the subpacket. This can be problematic if the residual power level is insufficient for retransmitting the subpacket.

For example, if a scheduler unit within a base station receives a data payload for transmission to a remote station, the data payload is redundantly packed into a plurality of subpackets, which are sequentially transmitted to a remote station. Redundancy refers to the substantially similar information carried by each subpacket. When transmitting the subpackets, the scheduler unit may decide to transmit the subpackets either periodically or in a channel sensitive manner.

For illustrative ease only, the nomenclature of the cdma2000 system is used herein. Such use is not intended to limit the implementation of the invention to cdma2000 systems. In an exemplary CDMA system, data traffic can be transported in packets, which are composed of subpackets, which occupy slots. Slot sizes have been designated as 1.25 ms, but it should be understood that slot sizes might vary in the embodiments described herein without affecting the scope of the embodiments. In addition, data traffic can be transmitted in message frames, which can be 5 ms, 10 ms, 20 ms, 40 ms, or 80 ms in duration. The terms "slots" and "frames" are terms used with respect to different data channels. A CDMA system comprises a multitude of channels on the forward and reverse links, wherein some channels are generated differently from others. Hence, the terminology to describe some channels will differ in accordance with channel structure. For illustrative purposes only, the term "slots" will be used hereafter to describe the packaging of signals propagated over the air.

The forward link comprises a plurality of channels, including but not limited to a pilot channel, synchronization channel, paging channel, quick paging channel, broadcast channel, power control channel, assignment channel, control channel, dedicated control channel, fundamental channel, supplemental channel, supplemental code channel, and packet data channel. The reverse link also comprises a plurality of channels. Each channel carries different types of information to a target destination. Typically, voice traffic is carried on fundamental channels, and data traffic is carried on supplemental channels or packet data channels. Supplemental channels are usually dedicated channels, while packet data channels usually carry signals that are designated for different parties in a time-multiplexed manner. Alternatively, packet data channels are also described as shared supplemental channels. For the purposes of describing the embodiments herein, the supplemental channels and the packet data channels are generically referred to as data traffic channels.

Supplemental channels and packet data channels can improve the average transmission rate of the system by allowing the transmission of unexpected data messages to a target station. Since the remote station has no way of determining when a subpacket addressed to itself will arrive, a preamble must be associated with each subpacket, with the addressing information for the remote station. If the subpacket transmissions are periodic, then the first subpacket must have an easily detectable and decodable preamble, which could also inform the receiving station of the interval at which future subpacket transmissions will arrive. Alternatively, the delay between periodic transmissions may be a system parameter that is already known to the receiver. If the subsequent subpacket transmissions after the first subpacket transmission are aperiodic, then each subsequent subpacket transmission must also have a preamble.

In one embodiment, an ARQ channel is generated for the reverse link so that a remote station can transmit an acknowledgment signal if a subpacket has been correctly decoded. If a base station receives such a signal, then there is no need to transmit the redundant subpackets, thus increasing the system throughput.

In this data transmission scheme, the remote stations must be able to detect and decode the redundant subpackets. Since the additional subpackets carry redundant data payload bits, the transmission of these additional subpackets will be referred to alternatively as "retransmissions." In order to detect the retransmissions, it is necessary for the remote station to be able to detect the preamble bits that typically precede the subpackets.

It should be noted that if the retransmission is being transmitted at a lower available power, then the preamble could also be transmitted at a lower available power. Since the accurate decoding of the preamble is vital, there is a possibility that the entire subpacket will be lost if the receiving party cannot successfully decode the preamble at the lower residual power.

Another consideration is the overhead occupied by the preamble bits. If the length of a preamble is M bits and the length of the entire subpacket is N bits, then a constant percentage M/N of the transmitted bitstream is devoted to non-traffic information. This inefficiency implies that a more optimal data transmission rate can be achieved if preamble information can be more efficiently conveyed.

The embodiments described herein are for decoding preamble information in those systems that transmit preamble information on a separate channel from the channel carrying user payload. In addition, acknowledgments and negative acknowledgments relating to the decoding of received preambles and data subpackets can be used to optimize the scheduling of retransmissions by a base station.

In a system that comprises an ARQ channel on the reverse link and a preamble channel and a data traffic channel on the forward link, a base station will transmit packetized data traffic on the data traffic channel and preamble traffic on a preamble channel, wherein the preamble traffic informs a remote station that it is the target destination of subpackets on designated slots of the data traffic channel. The ARQ channel is used on the reverse link to inform a transmitting base station that its data traffic transmission has or has not been accurately decoded by the remote station. In an embodiment described herein, the signals received on the ARQ channel are used to directly acknowledge receipt of data subpackets on the data traffic channel and to indirectly acknowledge the receipt of preambles on the preamble channel. Using these inferences as to the receipt of preambles, a scheduling unit in the base station can enhance the scheduling of retransmissions and new data traffic payloads by making the scheduling more efficient.

Figure 2:
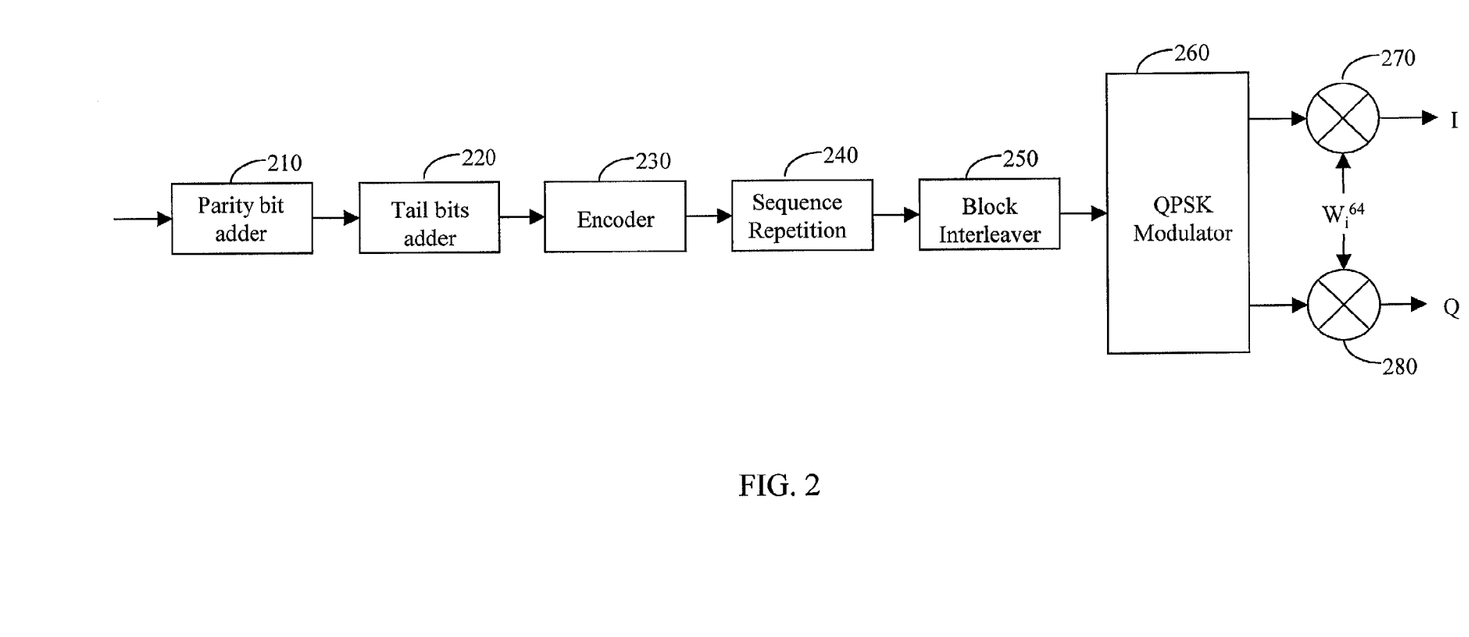
FIG. 2 is a block diagram of an apparatus that can be used to generate a preamble channel structure.

An example of an apparatus that can be used to generate a preamble channel generated in conjunction with a data traffic channel is shown in FIG. 2. In FIG. 2, a preamble sequence is generated for transmission on a forward link using an apparatus described by functional blocks. The forward link channel that carries the preamble information will be referred to as a Forward Secondary Packet Data Control Channel (F-SPDCCH) in one embodiment.

An input preamble information bitstream comprises bits designated for use as a medium access control (MAC) identifier, a subpacket identifier, and an ARQ channel identifier. Additional information, such as the payload size and the number of slots used per data traffic channel, can be carried by the preamble information bitstream for use in a multi-channel system. In an embodiment, the data traffic channel is referred to as a forward packet data channel (F-PDCH).

In one embodiment, the preamble information bitstream comprises fifteen bits per N-slot F-SPDCCH subpacket, wherein N=1, 2, or 4. Of these fifteen bits, six bits are allocated for the MAC identifier, two bits for the subpacket identifier, two bits for the ARQ channel, three bits for the payload size, and two bits for the number of slots that the data payload occupies on the traffic channel. The MAC identifiers are assigned to remote stations in accordance with a unique International Mobile Station Identify (IMSI) when the remote stations enter the communication system.

In one embodiment, an extra bit can be appended to the preamble information bitstream by a cyclic redundancy check (CRC) coding element 210, so that the number of bits carrying the preamble information is suitable for Quadrature Amplitude Modulation (QAM), which has higher spectral efficiency.

In another embodiment, an additional plurality of bits may be appended to the tail of the preamble information sequence at a zero padding element 220, so that a convolutional encoding element 230 is re-initialized with each new preamble information bitstream. In one embodiment, the zero-padding element appends eight zero-value bits to the preamble bitstream.

After zero-padding, the preamble bits are input into an encoding element 230. In an embodiment wherein twenty-four code symbols have been generated from the original fifteen-bit preamble bitstream, a convolutional encoder with constraint length K=9 and operating at rate R=½ suffices to generate 48 code symbols per F-SPDCCH subpacket.

In this embodiment, a repetition element 240 is then used to produce a sequence of repetitions of the forty-eight code symbols. With a repetition factor of N, there will be 48N symbols per N-slot F-SPDCCH subpacket. In the embodiment wherein the slot size is 1.25 ms, the symbol rate of the repetition sequence is 38.4 kilosymbols per second (ksps). After repetition, the symbols are then interleaved by an interleaver element 250 to protect from fading conditions inherent in mobile, over-the-air transmissions.

The interleaved symbols are then separated into in-phase (I) and quadrature phase (Q) components by a quadrature phase shift keying (QPSK) modulation element 260. The I and Q symbols are then spread by multipliers 270, 280 using the $i^{th}$ 64-ary Walsh code function in one embodiment. It should be noted that for other CDMA systems, other orthogonal or quasi-orthogonal functions could be substituted for Walsh code functions. The resulting sequence is transmitted over the air to a target station.

Figure 3:
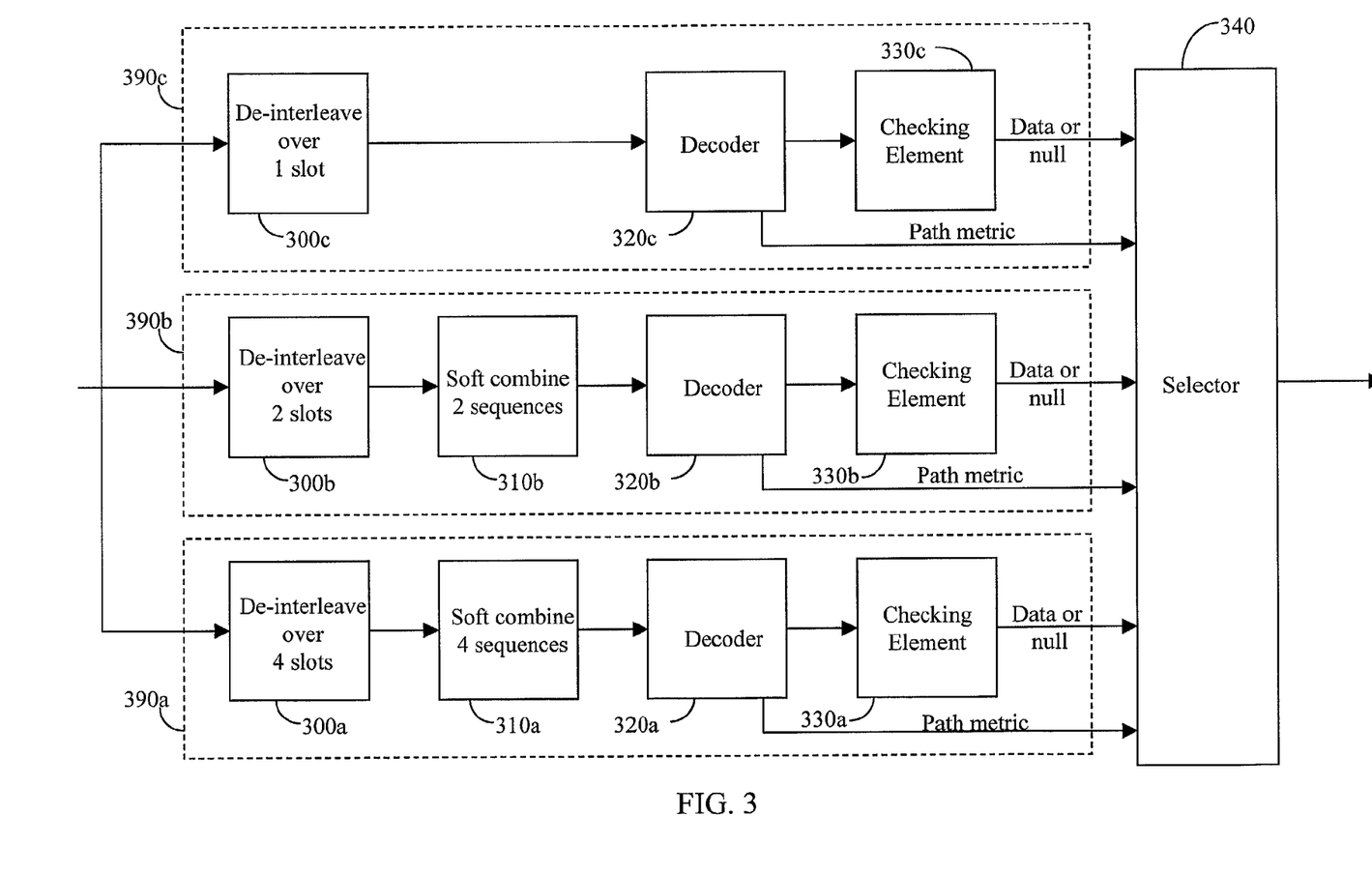
FIG. 3 is a block diagram of a preamble decoder.

FIG. 3 is a block diagram of one embodiment of a preamble decoder located at a target station. As discussed above, accurate decoding of the preamble on the F-SPDCCH is essential for the receipt of data traffic on the forward link, in particular, the data traffic channel F-PDCH, which is designed to initiate transmissions at irregular instances. The preamble decoder described in FIG. 3 is to be used within a communication system comprising at least one preamble channel and at least one data traffic channel. In one embodiment, preambles and data traffic are transmitted in subpackets and occupy the same slot positions in the parallel channels. That is, the slots occupied by the preamble on the preamble channel have the same timing as the slots occupied by the data traffic subpacket on the data traffic channel.

In another embodiment, the number of preamble slots need not be identical to the number of slots occupied by the data traffic. In the embodiment described in FIG. 3, preamble subpackets are designed to occupy 1, 2, or 4 slots, while data traffic subpackets can occupy 1, 2, 4, or 8 slots. The target station can use the MAC identifier carried by the preamble subpackets to determine that eight (8) slots of data traffic on the data traffic channel corresponds to the preamble.

Whether the number of preamble channel slots perfectly reflects the number of traffic channel slots is irrelevant to the novel preamble decoding apparatus and methods described herein. For illustrative ease, only one preamble decoder is described, wherein the preamble decoder is for a system that uses 1, 2, or 4 slots for conveying preamble subpackets.

At a receiver (not shown), a sequence of demodulated soft-decision values is input into a plurality of detection elements 390*a*, 390*b*, 390*c*, which are configured to accommodate data from a variable number of slots. Each of the detection elements 390*a*, 390*b*, 390*c* receives a sequence of values from a variable number of slots, which are input into parallel de-interleaving elements 300*a*, 300*b*, 300*c*. In one embodiment, the first de-interleaving element 300*a* de-interleaves over four (4) slots. The second de-interleaving element 300*b* de-interleaves over two (2) slots. The third de-interleaving element 300*c* de-interleaves over one (1) slot. The output of the first de-interleaving element 300*a* is soft-combined by a combining element 310*a* so that the four sequences, wherein each sequence had occupied a slot, are soft-combined into one sequence. The output of the second de-interleaving element 300*b* is soft-combined by a combining element 310*b* so that the two sequences, wherein each sequence had occupied a slot, are soft-combined into one sequence. The output of each combining element 310*a*, 310*b* and the third de-interleaving element 300*c* are each input into separate decoding elements 320*a*, 320*b*, 320*c*. In one embodiment, a convolutional decoder of constraint length K=9, and rate R=½ is used for each parallel stream. It should be understood that other decoders may be used without effecting the scope of this embodiment.

The output for each decoding element 320*a*, 320*b*, 320*c* is a data sequence and a best path metric value. Hence, there are three data sequences and three best path metric values existing at this point in this embodiment. Each of the three data sequences is input into one of a plurality of sequence checking elements 330*a*, 330*b*, 330*c*. A sequence checking element can comprise a processing element and a memory element, which are configured to determine whether the bit values of the decoded symbols match a known set of identifiers. In one embodiment, the known set of identifiers can comprise information such as a MAC identifier, an expected number of F-PDCH slots, and/or a parity bit.

Since the preamble sequence was originally coded to occupy one, two, or four slots, only one output from the sequence checking elements 330*a*, 330*b*, 330*c* should result in a data sequence. The other sequence checking elements that cannot match the data sequences to known identifiers will be configured to output null values.

However, if for some reason more than one data sequence is output from the sequence checking elements 330*a*, 330*b*, 330*c*, then a selection element 340, comprising a processing element (not shown) and a memory (not shown), can be used to select a data sequence as being the true preamble sequence. The selection element 340 is configured to receive data sequences from the sequence checking elements 330*a*, 330*b*, 330*c*, and to receive a best path metric value from each of the decoding elements 320*a*, 320*b*, 320*c*. Using the best path metric values, the selection element 340 can select a data sequence as the decoded preamble, and pass this data sequence, along with an indication of the slots used to carry this data sequence, to the receiver.

While the preamble decoder of FIG. 3 is decoding the information on the preamble channel, the receiver receives information on the data traffic channel. In one embodiment, multiple buffers are set up to receive and store slot information in accordance with slot sizes. For example, a first buffer is used to store the soft-decision values of one slot. A second buffer is used to store the soft-decision values of two slots. A third buffer is used to store the soft-decision values of four slots. A fourth buffer is used to store the soft-decision values of 8 slots. Once the preamble decoder makes a determination as to the number of slots carrying the preamble or the number of slots indicated by the contents of the preamble, a control element receives the slot number information and chooses the contents of the appropriate buffer for decoding. Only the contents of the chosen buffer need be decoded.

Once the preamble information and the data traffic are received and decoded at a receiving station, acknowledgment of the receipt of the information is desirable. In one embodiment, an ARQ channel is configured to convey acknowledgment information. However, in addition to the direct acknowledgment of a good data traffic subpacket, the acknowledgment signals can be used to make inferences as to whether a preamble arrived intact. Hence, an ARQ channel that is configured to acknowledge receipt of one channel can be used to acknowledge the receipt of two channels.

Figure 4:
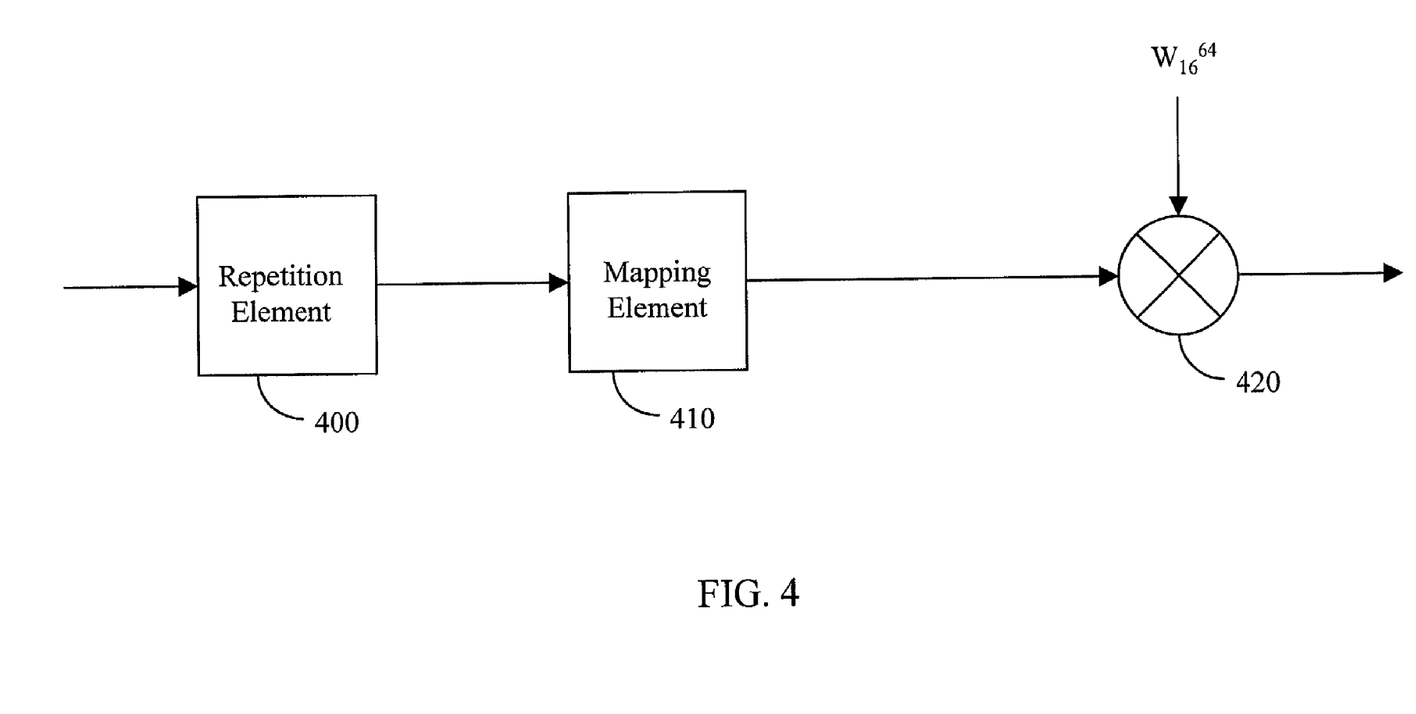
FIG. 4 is a block diagram of an apparatus that can be used to generate an ARQ channel.

An example of an apparatus used to generate an ARQ channel structure is shown in FIG. 4. A remote station (not shown) generates one bit, either 0 or 1, for each slot to indicate whether a subpacket has been accurately decoded or not. The bit is repeated a plurality of times in a repetition element 400. In a system that transmits at a rate of 1.2288 megachips per second (Mcps), an optimal repetition factor is twenty-four (24). The term "chip" is used to describe a bit in a spread sequence, such as a bit pattern spread by a Walsh code. The output of the repetition element 400 is mapped by a mapping element 410 to either +1 or −1. The output of the mapping element 410 is covered by a spreading element 420. In one embodiment, the spreading element 420 can be a multiplier that spreads the mapping output by an $i^{th}$ 64-ary Walsh code function. The use of Walsh codes provides for channelization and for resistance to phase errors in the receiver. It should be noted that for other CDMA systems, other orthogonal or quasi-orthogonal functions could be substituted for Walsh code functions.

Figure 5:
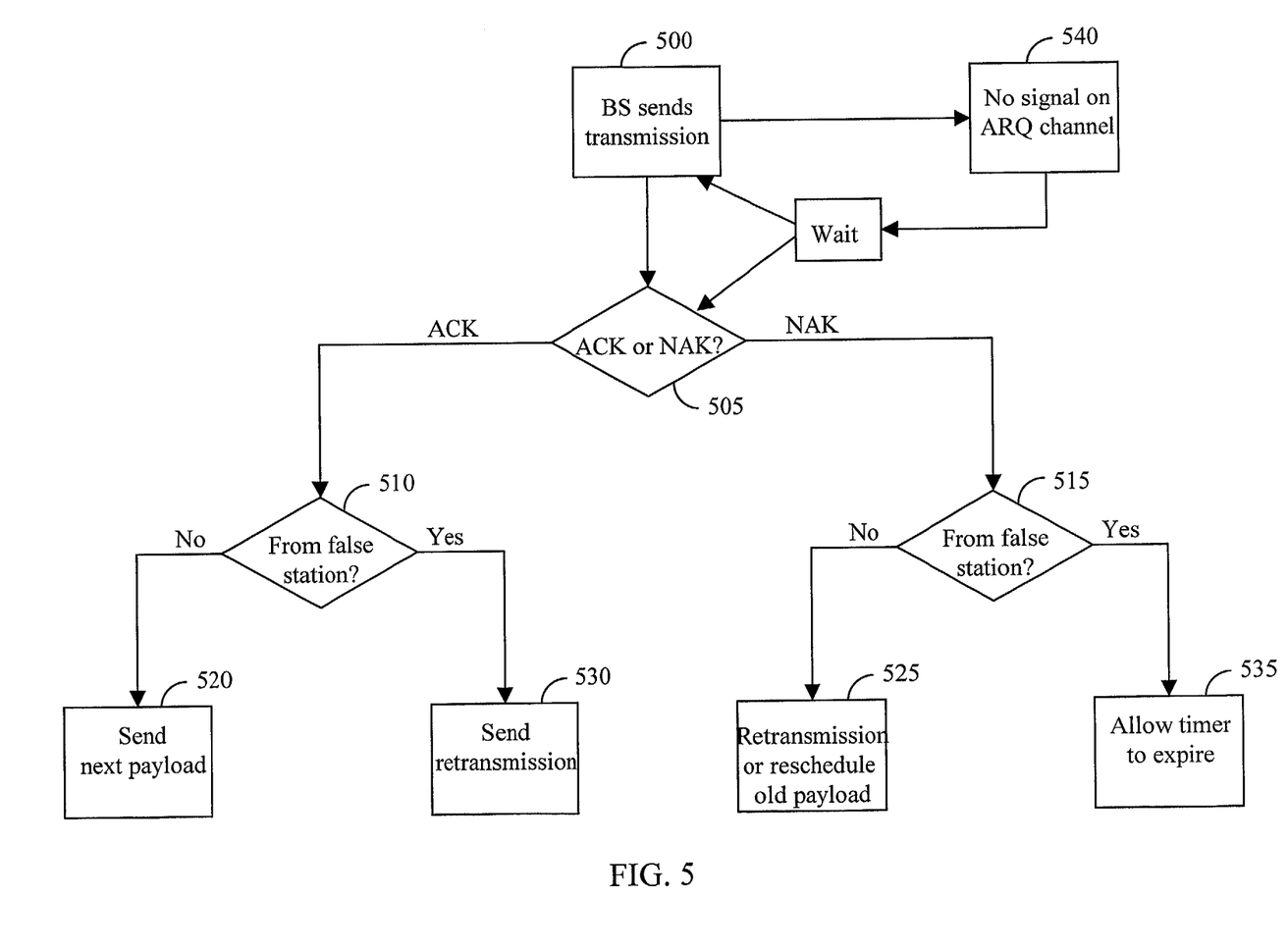
FIG. 5 is a flow chart illustrating the use of ACKs and NAKs for prompting retransmissions and new transmissions at a base station.

FIG. 5 is a flow chart describing a method for using information received on the ARQ channel, or the lack thereof, to schedule retransmissions by a scheduling element in the base station. The method allows the base station to optimize data traffic retransmissions to a target remote station in accordance with acknowledgments of preambles transmitted by the target remote station on an ARQ channel. It should be noted that there are two methods of transmitting redundant subpackets, or "retransmissions." First, a plurality of subpackets can be transmitted in a periodic manner. Although the first transmission may not be pre-scheduled, a traffic channel can be implemented wherein all retransmissions of a first transmission occur after a predetermined delay. This predetermined delay can be a system parameter so that after the first data transmission and the first preamble transmission are received by a target station, no preambles are sent along with the subsequent retransmissions since the target station knows that the subpackets received after a predetermined delay are directed toward itself. This periodic transmission method is referred to as Synchronous Incremental Redundancy (SIR).

The second manner of transmitting redundant subpackets is to send the subpackets in an aperiodic manner in accordance with channel conditions. This channel sensitive scheme requires the use of a preamble for each transmitted redundant subpacket since the target station cannot otherwise determine that it is the true target of the data traffic payload. This aperiodic transmission is referred to as Asynchronous Incremental Redundancy (AIR).

At step 500, a scheduling element in a base station (not shown), wherein the scheduling element comprises at least a control processor and a memory element, schedules the transmission of a preamble and associated data traffic subpackets over a plurality of slots on the preamble channel and a data traffic channel, respectively.

At step 505, the base station receives a signal on the ARQ channel. If the signal is an ACK, then the program flow proceeds to step 510. If the signal is a NAK, then the program flow proceeds to step 515.

At step 510, the base station determines whether the ACK was a false alarm. A false alarm is an ACK from a remote station that is not the target station. The base station knows that an ACK is a false alarm because the base station can determine the identity of the remote station. In a CDMA system, reverse link channels can be identified by a time shift in a long pseudorandom noise (PN) code. A detailed description of the identification process is provided in the aforementioned U.S. Pat. Nos. 5,103,459 and 4,901,307. If the remote station identity is correct, then at step 520, the base station knows that the preamble was received and proceeds to transmit the next data traffic payload rather than a retransmission of the last data traffic payload. If the remote station identity is not correct, then at step 530, the base station ignores the ACK signal and continues with the scheduled retransmissions.

Since the remote station had transmitted the ACK under the mistaken belief that the first transmission was for itself, any further retransmissions of the redundant subpackets would be a message to the remote station that the first transmission was a mistake. The remote station can be programmed to discard the first transmission if retransmissions occur even after an ACK is transmitted.

At step 515, the base station has received a NAK and must make an identification of the sender of the NAK as the target station. At this point, receipt of a NAK informs the base station that the preamble was received, but not the data traffic subpacket. At step 525, the base station sends the next retransmission if the NAK is from the target station. If no retransmissions are scheduled, then the base station reschedules a new series of redundant subpackets carrying the same data traffic payload. At step 535, the base station determines that the NAK is from a false recipient station and allows a timer, common to both the base station and the false station, to expire without making a retransmission. Since the base station purposefully ignored the negative acknowledgment of the remote station, the remote station would know that it was not the target of the preamble and data traffic because a retransmission was not received in a timely manner. The remote station can include a timer that starts counting down when a first transmission is received and stops when another is subsequently received. If no subsequent packet arrives before the timer expires, then the remote station knows that the first transmission was a mistake and discards the first transmission.

At step 540, the base station has received neither an acknowledgment nor a negative acknowledgment. If no signals are received within a predetermined time delay, then the base station knows that a preamble was not received. If the system follows an SIR transmission scheme, then the base station knows that the first subpacket was not received and subsequent retransmissions will also not be received. Hence, the entire data traffic payload must be rescheduled for transmission. In one embodiment, this problem can be avoided by transmitting two preambles in SIR systems, one for the first transmission and one for the first retransmission. If the first preamble is not received, it is possible that the second preamble may still be received and decoded. The program flow could then proceed to step 505. However, if neither the first nor the second preambles are received during an allotted waiting period, the program flow would proceed back to step 500, where the base station reschedules the old data traffic for another transmission pattern.

Figure 6:
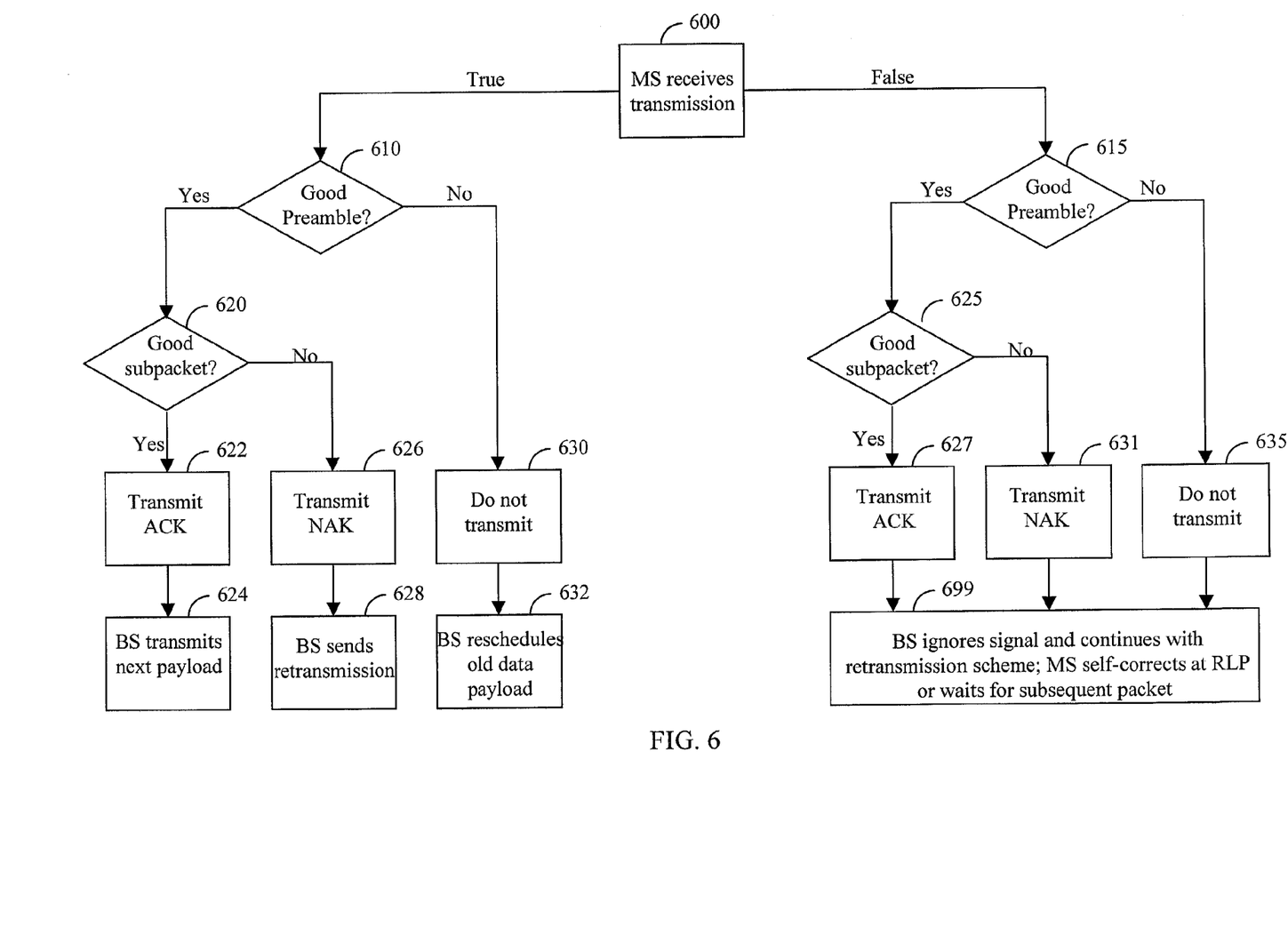
FIG. 6 is a flow chart illustrating the generation of ACKs and NAKs at a remote station and the use of ACKs and NAKs at a base station.

FIG. 6 is a flow chart describing an error-correcting scheduling scheme between a base station (not shown) and a remote station (also not shown) whenever a transmission error in the ARQ channel, preamble channel, or data traffic channel occurs. At step 600, a remote station receives a preamble transmission and a subpacket transmission. Due to the possibility that a remote station mistakenly determines itself as the target destination of the preamble transmission and subpacket transmission, the program flow is split into two paths. If the remote station is the true target of the base station transmissions, then the program flow proceeds to step 610. If the remote station is not the true target of the base station transmissions, then the program flow proceeds to step 615.

If the remote station receiving the transmission is the intended recipient of the transmission, then at step 610, the remote station decodes the information conveyed by the preamble channel. One method of decoding the preamble information is described above. If the preamble is decoded accurately, then the remote station decodes the associated subpacket information on the data traffic channel at step 620. If the subpacket can be correctly decoded, then the remote station transmits an ACK at step 622. When the base station receives the ACK, a scheduling element in the base station stops the scheduled retransmissions of the redundant subpackets and schedules the transmission of a new data payload on the forward link at step 624. It should be noted that the new data payload can be directed to the same remote station that transmitted the ACK, or the new data payload can be directed to another remote station within the transmission range of the base station.

Due to interference during transmission, an ACK that is transmitted by the remote station may be garbled and degraded to the point where a base station reads a NAK on the ARQ channel, rather than an ACK. When this occurs, the scheduling element in the base station would continue with the scheduled retransmission. The remote station would then receive a redundant subpacket that can be identified as a redundant transmission, and would use a metric value from the decoder to determine which subpacket to pass to the RLP layer. The RLP layer provides in-order delivery of RLP packets and the detection of duplicate packets, which reduces the radio link error rate as seen by the higher layer protocols.

If the subpackets transmitted on the data traffic channel cannot be decoded, then the remote station transmits a NAK at step 626. At step 628, the base station sends a retransmission. The remote station retains the old data subpacket in a buffer until a timer expires and passes the old data subpacket to the RLP layer as an error. If the retransmission arrives within the time allotted by the timer, the retransmission is decoded and passed to the RLP layer if the attached CRC bits pass a CRC check. If the retransmission cannot be decoded, the retransmission is passed to the RLP layer as an error.

Alternatively, if the NAK is garbled during transmission so that it is mistakenly read as an ACK, the base station will transmit a new data payload to the remote station. In this instance, the remote station retains the old data subpacket in a buffer until a timer expires. If the timer expires before a retransmission expires, the old data subpacket is passed to the RLP layer as an error.

If a NAK is transmitted by the remote station, but no ACK or NAK is received at the base station, then the scheduling element, which is configured to assume that the preamble was never received, reschedules the transmission of the old data payload. The remote station retains the old data subpacket in a buffer until a timer expires. If the timer expires before a retransmission arrives, the old data subpacket is passed to the RLP layer as an error.

If the remote station cannot decode the preamble payload, i.e., information about the associated data traffic subpacket, then the program flow proceeds from step 610 to step 632 via step 630, wherein the remote station does not send a transmission on the ARQ channel. If no acknowledgment or negative acknowledgment is received at the base station, then the scheduling element at the base station, which is configured to assume that the preamble was never received, reschedules the old data payload into a new transmission schedule. It should be noted that the ARQ channel is for acknowledging the receipt of data traffic subpackets. If a NAK had been generated and received in this instance, the scheduling element would have assumed that the preamble had arrived intact and would have merely sent an already scheduled retransmission, or the scheduling element would have transmitted a new data payload if the NAK had been garbled and read as an ACK.

If the remote station decodes the preamble payload incorrectly, for example, if the remote station incorrectly decodes the sequence numbering of the subpackets, then the remote station can become conflicted when a subsequent subpacket arrives with either the same information or with an out-of-sequence numbering. In one embodiment, the remote station can be programmed to either ignore the newly arrived subpacket with conflicting information, or to use a best metric value to choose between the old subpacket stored in a buffer and the newly arrived subpacket. If the remote station is programmed to ignore the newly arrived subpacket with conflicting information, then no resources are required to decode the subpacket. In either case, no signal is sent on the ARQ channel to the base station, so that the base station reschedules the transmission of the old data payload.

In an alternate path, the program flow proceeds from step 600 to step 615 if the remote station receives transmissions for which the remote station is not the intended recipient. At step 615, the remote station attempts to decode a preamble sequence received on the preamble channel. If the preamble can be decoded, then at step 625, the remote station will attempt to decode the associated subpacket.

If the subpacket can be correctly decoded, then the remote station will pass the decoded transmission to the RLP layer and transmit an ACK at step 627. At step 699, the base station receives the ACK but ignores the signal because the signal is arriving from a non-intended recipient. The base station can determine that the remote station is not the intended target due to the identification of the unique time shifts of the long PN code. The scheduling element in the base station continues without acknowledging the signal because the scheduling element knows that the remote station is not the intended recipient of the previous transmissions from the base station. At the remote station, the RLP layer has received the data subpacket and determines that the data subpacket was erroneously passed.

If the ACK signal is garbled to the point where the base station detects the ACK as a NAK, the base station again ignores the signal because the base station has determined the signal to be a false alarm. The RLP of the remote station deals with the error. If the base station receives no signal, the base station continues with the scheduled retransmission scheme and the RLP of the remote station deals with the error.

If, at step 625, the remote station cannot decode the subpacket, the remote station transmits a NAK at step 631. At step 699, the base station determines that the remote station that had transmitted the NAK was not the intended recipient of the original transmission, and ignores the signal. In one embodiment, a timer can be set in the base station and in the remote station so that if the base station ignores the signal and refrains from sending retransmissions, the remote station is notified that the previous transmission was a false alarm. The remote station would have kept the old transmission in a buffer and then passed the old transmission to the RLP as an error. If a retransmission is received before the timer expires, the remote station can either pass the retransmission to the RLP or soft-combine the retransmission with the old transmission, the result of which is passed to the RLP. At the RLP layer, the error is detected and corrected.

If the base station does not receive the NAK from the remote station, then the base station will continue with the scheduled retransmissions of the redundant subpackets. This action would cause the remote station to buffer and decode retransmissions, which the remote station considers to be spurious. The information from the transmission with the best metric is passed to the RLP, which corrects the false information.

If the remote station cannot decode the preamble, then the program flow proceeds from step 615 to step 635, wherein no signal is transmitted on the ARQ channel. The base station would continue with the scheduled retransmission scheme. However, since the remote station did not transmit an ARQ signal, the remote station is expecting a new transmission of the old data payload, not a retransmission. The receipt of a retransmission would indicate to the remote station that it was the erroneous recipient of that particular data payload. The remote station would pass the old transmission to the RLP as an error.

If the base station receives a perceived ARQ signal due to interference in the reverse link, the base station would identify the remote station as an incorrect recipient of the data and ignore the perceived ARQ signal. In one embodiment, a timer can be set in the base station and in the remote station so that if the base station ignores the signal and refrains from sending retransmissions, the remote station is notified that the previous transmission was a false alarm.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus in a remote station for decoding a preamble channel, wherein the preamble channel carries variably sized preamble sequences, comprising:
   a plurality of preamble size detection elements for determining a number of slots occupied by a preamble sequence on the preamble channel which is separate from a traffic channel, wherein each of the plurality of preamble size detection elements outputs a potential preamble sequence and a best path metric; and
   a selection element for choosing a true preamble sequence from the potential preamble sequences output from the plurality of detection elements;
   wherein each of the plurality of detection elements comprises:
   a de-interleaver for operating over a predetermined number of slots of the preamble channel, wherein each de-interleaver of the plurality of detection elements operates over a different predetermined number of slots;
   a decoder for extracting preamble information on from the preamble sequence; and
   a sequence checker for determining if an identifier is present in the preamble information.

2. The apparatus of claim 1, wherein at least one of the plurality of detection elements further comprises a combining element operating over at least two slots, wherein the at least one of the plurality of detection elements operates over the at least two slots.

3. The apparatus of claim 1, wherein the decoder is a convolutional decoder.

4. The apparatus of claim 1, wherein the identifier is a Medium Access Control (MAC) identifier.

5. The apparatus of claim 1, wherein each decoder in the plurality of detection elements outputs a best path metric value and the potential preamble sequence.

6. An apparatus in a remote station for decoding a preamble channel, wherein the preamble channel carries variably sized preambles sequences, comprising:
   a plurality of preamble size detection elements for determining a number of slots occupied by preamble sequence on the preamble channel which is separate from a traffic channel, wherein each of the plurality of preamble size detection elements outputs a potential preamble sequence and a best path metric; and
   a selection element for choosing a true preamble sequence from the potential preamble sequences output from the plurality of detection elements, wherein the selection element is further for determining the number of slots occupied by a data subpacket on a non-preamble channel, wherein the number of slots occupied by the data subpacket is associated with the number of slots occupied by the true preamble sequence.

7. A method for determining preamble information transmitted on a preamble channel, comprising:
   de-interleaving over one slot of the preamble channel which is separate from a traffic channel to form a first de-interleaved sequence;
   de-interleaving over at least two slots of the preamble channel to form a second de-interleaved sequence, wherein the first slot of the at least two slots is the slot used in the first de-interleaving step;
   soft-combining the second de-interleaved sequence;
   decoding the first de-interleaved sequence to generate a first potential preamble and a first metric value;
   decoding the second de-interleaved sequence to generate a second potential preamble and a second metric value; and
   choosing between the first potential preamble and the second potential preamble to select true preamble.

8. The method of claim 7, wherein choosing between he first potential preamble and the second potential preamble comprise:
   checking for an identifier in the first potential preamble and in the second potential preamble; and
   selecting either the first potential preamble or the second potential preamble in accordance with the presence of the identifier.

9. The method of claim 8, wherein selecting either the first potential preamble or the second potential preamble comprises selecting either the first potential preamble or the second potential preamble in accordance with the better of the first metric value or the second metric value if the identifier is present in both the first potential preamble and the second potential preamble.

10. The method of claim 8, wherein selecting either the first potential preamble or the second potential preamble comprises selecting either the first potential preamble or the second potential preamble in accordance with the better of the first metric value or the second metric value if the identifier is not present in the first potential preamble or in the second potential preamble.

11. A method for determining preamble information carried by a preamble channel which is separate from a traffic channel, comprising:
   de-interleaving over a variable number of slots for a plurality of de-interleaving results;
   soft-combining symbols within each of the plurality of de-interleaving results, except in the instance when the de-interleaving is over one slot;
   decoding the one-slot de-interleaved symbol and the soft-combined symbol associated with each of the plurality of de-interleaving results;
   checking the decoded symbols for an identifier; and
   extracting the preamble information from the checked symbol that carries the identifier.

12. An apparatus for determining preamble information transmitted on a preamble channel, comprising:
   means for de-interleaving over one slot of the preamble channel which is separated from a traffic channel to form a first de-interleaved sequence;
   means for de-interleaving over at least two slots of the preamble channel to form a second de-interleaved sequence, wherein the first slot of the at least two slots is the same slot as the first de-interleaving step;
   means for soft-combining the second de-interleaved sequence;
   means for decoding the first de-interleaved sequence to generate a first potential preamble and a first metric value and for decoding the second de-interleaved sequence to generate a second potential preamble and a second metric value; and
   means for choosing between the first potential preamble and the second potential preamble as a true preamble.

13. An apparatus for determining preamble information carried by a preamble channel which is separate from a traffic channel, comprising:
   means for de-interleaving over a variable number of slots for a plurality of de-interleaving results;
   means for soft-combining symbols within each of the plurality of de-interleaving results, except for the de-interleaving result over one slot;
   means for decoding the one-slot de-interleaved symbols and the soft-combined symbols associated with each of the plurality of de-interleaving results;
   means for checking the decoded symbols for an identifier; and
   means for extracting the preamble information from the checked symbol carrying the identifier.

* * * * *